Figure 1:
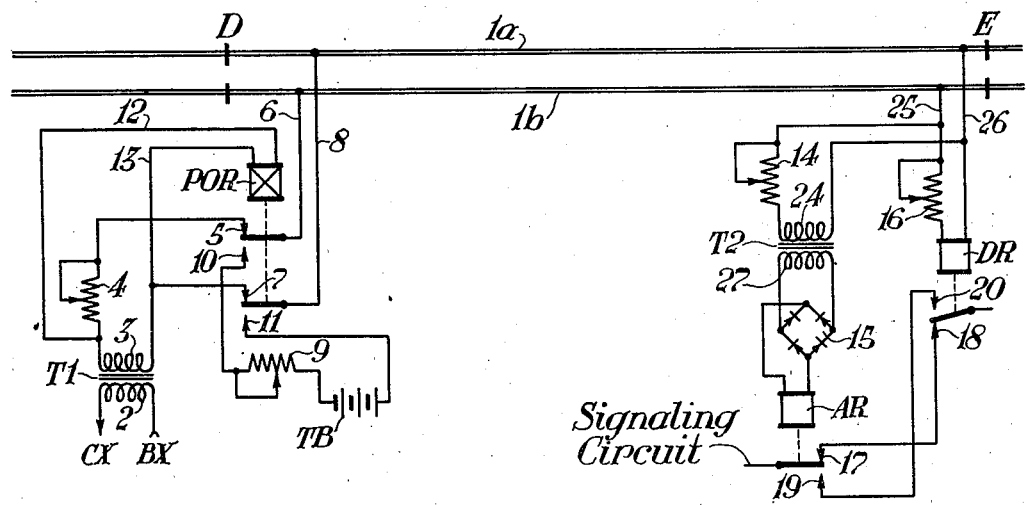

April 21, 1942.  H. G. WITMER  2,280,464

RAILWAY TRACK CIRCUIT APPARATUS

Filed April 26, 1941

INVENTOR
Harold G. Witmer
BY
HIS ATTORNEY

Patented Apr. 21, 1942

2,280,464

UNITED STATES PATENT OFFICE 2,280,464

RAILWAY TRACK CIRCUIT APPARATUS

Harold G. Witmer, Edgewood, Pa., assignor to The Union Switch & Signal Company, Swissvale, Pa., a corporation of Pennsylvania Application April 26, 1941, Serial No. 390,438

9 Claims. (Cl. 246—34)

My invention relates to railway track circuit apparatus, and more particularly to such apparatus by which high shunting sensitivity is assured.

Track circuits characterized by high shunting sensitivity are essential in railway signaling. Such characteristic requires that a track circuit provide a voltage across the track rails sufficiently high as to effectively break down the rail film resistance when the section is occupied. That is, the rail voltage must be effective to break down the wheel-rail contact resistance and cause a low resistance train shunt. Such relatively high voltage can readily be obtained by using alternating current since the peak values of such current serve to break down the rail film resistance. In the event alternating current is derived from a transmission line, the track circuit is subject to failure due to a loss of power because the transmission line may be destroyed by storms and the central power station may be cut off due to overload conditions and similar circumstances. If the alternating current is to be derived from a local source, then a generator or a tuned alternator and a relatively large battery are required for each track circuit, and such added equipment is expensive and is not always reliable in its operation. If direct voltage is used, then several battery cells in series are needed to provide the desired high voltage and such battery when in constant use is exhausted rapidly and must be given careful maintenance and frequent renewals.

In view of the circumstances recited above, a feature of my invention is the provision of novel and improved railway track circuit apparatus characterized by a relatively high shunting sensitivity which is assured at all times.

Another feature of my invention is the provision of novel means for providing a track section with alternative track circuits having substantially equivalent shunting sensitivity and each of which circuits is effective to govern an associated signaling means.

Again, a feature of my invention is the provision of apparatus of the type here involved wherewith a track section is equipped with a normally active alternating current track circuit and a standby direct current track circuit. Each circuit includes a relatively high voltage source and a resistor so proportioned and arranged that the two track circuits have substantially equivalent shunting sensitivity. A signaling circuit associated with such section is governed by the relays of the two circuits in such manner that it is checked over one of the relays up and the other relay down.

Other objects, advantages and features of my invention will appear as the specification progresses.

These features, advantages and objects embodying my invention I attain by providing at one end of a track section a source of alternating current of a predetermined voltage and a source of direct current of a voltage substantially equal to the peak voltage of the alternating current source, such direct voltage being obtained by including several cells of battery in series. The alternating current source is normally connected across the rails over a front contact of an alternating current power off relay and the direct current source is connected across the rails over a back contact of such power off relay, the direct current source thus serving as a standby source of power. Each such connection includes an appropriate resistor which aids in creating a relatively high voltage across the rails by limiting the flow of current thereto. By such an arrangement power for the source of the normal active alternating current track circuit may be derived from any convenient commercial transmission line and expensive standby alternating current equipment is not required. Such standby use of the direct current source permits the use of several cells of primary battery and enables the signal system to continue in operation without any sacrifice in the shunting sensitivity of the track circuit when the alternating current power fails. The cost of operation due to battery consumption with this arrangement will not be high because the loss of alternating current power will not, ordinarily at least, be often or for a long period and the battery will be used for only relatively short periods of time.

At the other end of the track section I provide track relay means which is effectively energized to a controlling condition by each form of power. Preferably such track relay means comprises two track relays, a first one of such relays being effectively energized by the alternating current supplied to the rails but not by the direct current, while the second relay is effectively energized in response to the direct current supplied to the rails but not by the alternating current. To assure that these two track relays are in the position in agreement with the connected or disconnected condition of the respective source of current, I control the associated signaling circuit over either one of two paths, the first one of which paths includes in series a front contact of a first one of the relays and a back contact of a second one of the relays, and the second of which paths includes in series a back contact of the first relay and a front contact of the second relay. A resistor is also preferably interposed in the connection of each of these two track relays as an aid in maintaining a relatively high shunting sensitivity of the respective relay.

I shall describe two forms of apparatus embodying my invention, and shall then point out the novel features thereof in claims.

Figure 2:
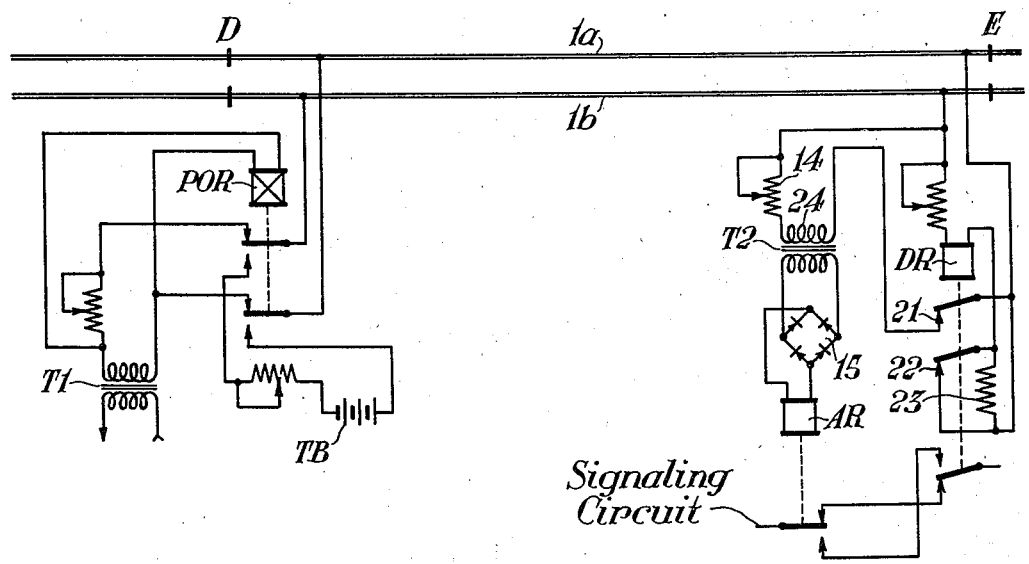

In the accompanying drawing, Fig. 1 is a diagrammatic view showing one form of railway track circuit apparatus embodying my invention, and Fig. 2 is a diagrammatic view showing a modification of the apparatus of Fig. 1 and which also embodies my invention.

In each of the two views, like reference characters are used to designate similar parts.

Referring to Fig. 1, the reference characters $1a$ and $1b$ designate the track rails of a stretch of railway which is formed by the usual insulated rail joints with a track section D—E, and which may be one section of a series of successive sections of a signal system. The track section D—E is provided with track circuit apparatus embodying my invention and wherewith the section D—E is equipped with alternative track circuits. Looking at end D of section D—E, two sources of current are provided, one of which is a track transformer T1 whose primary winding 2 is connected across the BX and CX terminals of an alternating current source, and the second source is a track battery TB. Ordinarily, primary winding 2 of transformer T1 would be supplied with power from a transmission line extending along the railway. The track battery TB is preferably made up of three or more cells of primary battery in series. It is to be understood of course that my invention is not limited to the use of primary battery cells and storage battery cells may be used if desired. The secondary winding 3 of transformer T1 is connected across the rails $1a$ and $1b$ of section D—E over a circuit connection one side of which includes a resistor 4, front contact 5 of a power-off relay POR, to be referred to later, and wire 6 to rail $1b$; and the other side of which connection includes front contact 7 of relay POR and wire 8 to rail $1a$. Battery TB is connected across the rails of section D—E over a circuit connection one side of which includes a resistor 9, back contact 10 of relay POR and wire 6 to rail $1b$; and the other side of which includes back contact 11 of relay POR and wire 8 to rail $1a$.

Relay POR is an alternating current relay of any convenient type and receives power from the source of alternating current by being connected across secondary winding 3 of transformer T1 over wires 12 and 13. It follows that relay POR is energized and picked up closing front contacts 5 and 7 to complete the connection of transformer T1 to the rails of section D—E, as long as power is supplied to transformer T1 from the associated transmission line, but that loss of such alternating current power permits relay POR to be released closing back contacts 10 and 11 to complete the connection of battery TB to the rails.

At the other end E of section D—E, there is provided a track relay means adaptable of receiving energy from the rails of the section and which relay means as here shown includes two relays AR and DR. A first one of the relays AR receives energy from the rails by a circuit connection including a resistor 14, a transformer T2 and a full wave rectifier 15, primary winding 24 of transformer T2 being connected across the rails over wires 25 and 26, while secondary winding 27 of transformer T2 is connected to the input terminals of rectifier 15 whose output terminals are connected to the relay AR. Consequently relay AR is supplied with rectified current and effectively energized thereby in response to the alternating voltage created across the rails by transformer T1. It is to be understood of course that relay AR may be an alternating current relay connected directly to the rails. The second relay DR is connected across the rails over a connection including a resistor 16, as will be readily understood by an inspection of Fig. 1, and relay DR is a direct current relay whereby that relay is effectively energized and picked up in response to the direct voltage applied to the rails from battery TB but not in response to the alternating voltage supplied to the rails by transformer T1. It is clear, therefore, that relay AR is responsive only to the alternating voltage applied to the rails when the section is unoccupied, and relay DR is responsive only to the direct voltage created across the rails when the section is unoccupied. In other words, transformer T1 and relay AR are included in an alternating current track circuit for section D—E, and battery TB and relay DR are included in a direct current track circuit for the section.

Relays AR and DR are used to control an associated signaling circuit, such signaling circuit being completed over either one of two paths, a first path including front contact 17 of relay AR in series with back contact 18 of relay DR, and a second path including back contact 19 of relay AR in series with front contact 20 of relay DR. Hence the signaling circuit is governed by the track circuits of section D—E irrespective of which one of the two track circuits is active. Furthermore, this signaling circuit checks the two track relays as to their position being in agreement to the connected or disconnected condition of the respective current source.

Transformer T1 is proportioned to supply a relatively high predetermined alternating voltage across the rails. At least the peak value of such alternating voltage is sufficiently high as to break down the rail film resistance when the section is occupied. Hence relay AR is effectively energized and picked up in response to such alternating voltage applied to the rails when the section is unoccupied and is shunted and released when the section is occupied at a relatively high shunting sensitivity. Furthermore, resistor 4 interposed in the connection of transformer T1 to the rails and resistor 14 interposed in the connection of relay AR to the rails aid in maintaining a relatively high voltage across the rails and in turn aid in providing the desired value of shunting sensitivity of the track circuit.

Track battery TB includes a sufficient number of battery cells so as to provide a direct voltage substantially equal to the peak voltage of the alternating voltage applied from transformer T1. Thus relay DR is effectively energized and picked up by such direct voltage when the section is unoccupied, and is shunted or released when the section is occupied at a relatively high shunting sensitivity, such shunting sensitivity being substantially equivalent to the high shunting sensitivity created by the alternating voltage. Resistor 9 interposed in the connection of battery TB to the rails, and resistor 16 interposed in the connection of relay DR to the rails aid in maintaining the desired high direct voltage across the rails and the desired shunting sensitivity for the associated track circuit.

It is to be seen, therefore, that as long as the alternating current source is active, relay POR is picked up and the alternating current track circuit is active and the signaling circuit is governed over the path including front contact 17 of relay AR and back contact 18 of relay DR. Loss of alternating current power causes relay POR to be released to connect battery TB to the rails and the direct current track circuit is made active and the signaling circuit is controlled over the path including back contact 19 of relay AR and front contact 20 of relay DR. In either case, substantially the same reliability in the control of the signaling circuit is effected because of the substantially equivalent shunting sensitivity and operating characteristics of the two track circuits.

In Fig. 2, the rails of section D—E are supplied either with an alternating voltage from transformer T1 or with a direct voltage from battery TB according to the energized or deenergized condition of relay POR, the same as in Fig. 1 and the description of this portion of the apparatus of Fig. 2 need not be repeated.

At the end E of section D—E of Fig. 2, the track relay means comprises relay AR and relay DR. Relay AR is connected to receive energy from the rails through resistor 14, transformer T2 and rectifier 15, the same as in Fig. 1, except for the fact that in Fig. 2 the connection of primary winding 24 of transformer T2 to rail 1a includes back contact 21 of relay DR. In Fig. 2, the connection of relay DR to the rails is modified from that of Fig. 1 by including a back contact 22 of the relay in multiple with a resistor 23. The signaling circuit of Fig. 2 is controlled by the two relays AR and DR in the same manner as in Fig. 1.

It is obvious that the operation of the apparatus of Fig. 2 is substantially the same as that of Fig. 1. In Fig. 2, when the alternating current power fails and battery TB is connected across the rails to energize relay DR, the path including resistor 14 and primary winding 24 of transformer T2 is disconnected from the rails at back contact 21 of relay DR and no current is consumed in such shunt path, thereby reducing the power output of the battery TB. When relay DR is picked up in response to the direct voltage, resistor 23 is included in the connection of relay DR and the energization of the relay is not increased because of the opening of the shunt path including primary winding 24, the removal of which shunt path would otherwise tend to increase the energization of relay DR once that relay is picked up.

It is to be seen, therefore, that I have provided novel and improved track circuit apparatus whereby a track section is equipped with a normally active alternating current track circuit and a standby direct current track circuit. By using this arrangement, the shunting sensitivity of the direct current track circuit may be made practically the equivalent of that obtained by the alternating current track circuit without a large consumption of track battery. Also, the alternating current circuit can be supplied from any convenient alternating current transmission line without the necessity of a standby alternating current source which usually is of relatively large initial expense especially at locations having only one commercial service. It is to be observed that while as here shown, the track relay means includes two relays, one responsive only to the alternating current, and the other responsive only to the direct current, these two relays may be replaced by a single relay and rectifiers arranged for the relay to be responsive both to the alternating current and to the direct current.

Although I have herein shown and described only two forms of railway track circuit apparatus embodying my invention, it is understood that various changes and modifications may be made therein within the scope of the appended claims without departing from the spirit and scope of my invention.

Having thus described my invention, what I claim is:

1. Railway track circuit apparatus comprising, a track section, a first circuit means including a source of alternating current and a first resistor for supplying across the rails at one end of the section a predetermined relatively high alternating voltage to provide a high shunting sensitivity for the track circuit because of breaking down of the rail film resistance by such voltage when the section is occupied, a second circuit means including a source of direct current and a second resistor for supplying across the rails at said one end of the section a direct voltage of a relatively high value which is effective to provide shunting sensitivity for the track circuit substantially equal to that provided by said predetermined alternating voltage, a power-off relay receiving power from said source of alternating current and operable when energized to close said first circuit means and when deenergized to close said second circuit means, track relay means connected to the rails at the other end of the section effectively energized by either said alternating or direct voltage when the section is unoccupied and deenergized when the section is occupied due to said high shunting sensitivity of the track circuit, and a signaling circuit controlled by said track relay means.

2. Railway track circuit apparatus comprising, a track section, a first circuit means including a source of alternating current and a first resistor for supplying across the rails at one end of the section a predetermined relatively high alternating voltage to provide a high shunting sensitivity for the track circuit because of breaking down of the rail film resistance by such voltage when the section is occupied, a second circuit means including several battery cells in series and a second resistor for supplying across the rails at said one end of the section a sufficiently high direct voltage to provide a shunting sensitivity of the track circuit substantially equivalent to that provided by said predetermined alternating voltage, a power-off relay receiving power from said source of alternating current and operable when energized to close said first circuit means and to open said second circuit means and when deenergized to reverse this condition, track relay means connected to the rails at the other end of the section in a manner as to include preselected resistance and effectively energized in response to either said alternating or direct voltage when the section is unoccupied and deenergized when the section is occupied due to the relatively high voltage across the rails as effected by either one of said sources and aided by said resistance included in the connection of the track relay means, and a signaling circuit controlled by said track relay means.

3. Railway track circuit apparatus comprising, a track section, a first circuit means including a source of alternating current and a first resistor for supplying across the rails at one end of the section a predetermined relatively high alternating voltage to provide a high shunting sensitivity for the track circuit because of breaking down of the rail film resistance by such voltage when the section is occupied, a second circuit means including several battery cells in series and a second resistor for supplying across the rails at said one end of the section a sufficiently high direct voltage to provide a shunting sensitivity of the track circuit substantially equivalent to that provided by said predetermined alternating voltage, a power-off relay receiving power from said source of alternating current and operable when energized to close said first circuit means and to open said second circuit means and when deenergized to reverse this condition, a first track relay receiving power from the rails at the other end of the section and effectively energized and picked up when the section is unoccupied only when said alternating voltage is supplied to the rails, a second track relay receiving power from the rails at said other end of the section and effectively energized and picked up when the section is unoccupied only when said direct voltage is supplied to the rails, and a signaling circuit including in series either a front contact of said first track relay and a back contact of said second track relay or in series a back contact of said first track relay and a front contact of said second track relay.

4. Railway track circuit apparatus comprising, a track section, a first circuit means including a source of alternating current and a first resistor for supplying across the rails at one end of the section a predetermined relatively high alternating voltage to provide a high shunting sensitivity for the track circuit because of breaking down of the rail film resistance by such voltage when the section is occupied, a second circuit means including several battery cells in series and a second resistor for supplying across the rails at said one end of the section a sufficiently high direct voltage to provide a shunting sensitivity of the track circuit substantially equivalent to that provided by said predetermined alternating voltage, a power-off relay receiving power from said source of alternating current and operable when energized to close said first circuit means and to open said second circuit means and when deenergized to reverse this condition, a first and a second track relay each adapted to receive power from the rails at the other end of the section through a respective resistor, said first track relay responsive only when alternating voltage is supplied to the rails and said second track relay responsive only when direct voltage is supplied to the rails, said first and second track relay provided with substantially equivalent shunting sensitivity because of the relatively high voltage created across the rails due to the respective source and the associated respective resistor, and a signaling circuit controlled over either a front contact of the first track relay and a back contact of the second track relay or over a front contact of the second track relay and a back contact of the first track relay.

5. In combination, a track section, a first track circuit for said section including a source of alternating current adapted to be connected across the rails at one end of the section through a first resistor and a first track relay connected across the rails at the other end of the section through a second resistor, a second track circuit for said section including a source of direct current adapted to be connected across the rails of said one end of the section through a third resistor and a second track relay connected across the rails at said other end of the section through a fourth resistor, a power-off relay receiving power from said alternating current source and effective when energized to close said first track circuit and open said second track circuit and when deenergized to open said first track circuit and close said second track circuit, and a signaling circuit controlled over either of two paths one of which paths includes in series a front contact of said first track relay and a back contact of said second track relay and the other of which paths includes in series a back contact of said first track relay and a front contact of said second track relay.

6. In combination, a track section, said section provided with a first track circuit including a source of alternating current of a predetermined voltage adapted to be connected across the rails at one end of the section through a first resistor and a first relay connected across the rails at the other end of the section through a second resistor and said first track circuit characterized by a relatively high shunting sensitivity due to the high voltage between the rails as effected by the peak voltage of said alternating current source and the current limiting action of said resistors, said section provided with a second track circuit including several cells of track battery adapted to be connected in series across the rails at said one end of the section through a third resistor and a second relay connected across the rails at said other end of the section through a fourth resistor and said second track circuit characterized by a shunting sensitivity equivalent to that of said first track circuit because of the voltage of said track battery and the action of said third and fourth resistors, a power-off relay receiving power from said alternating current source and effective when picked up to close the first track circuit and open the second track circuit and when released to open the first track circuit and close the second track circuit, and a signaling circuit controlled over either a front contact of the first track relay in series with a back contact of the second track relay or over a back contact of the first track relay in series with a front contact of the second track relay.

7. In combination, a track section, a first circuit means including a source of alternating current and a first resistor and effective when connected to the rails at one end of said section to create between the rails a predetermined relatively high voltage, a second circuit means including several cells of battery in series and a second resistor and effective when connected to the rails at said one end of the section to create between the rails substantially said predetermined high voltage, a power-off relay normally energized by said alternating current source and provided with a front contact interposed in said first circuit means and a back contact interposed in said second circuit means, a first track relay receiving energy from the rails at the other end of the section and effectively energized by the current of the first circuit means but not by the current of the second circuit means, a second track relay receiving energy from the rails at said other end of the section and effectively energized by the current of the second circuit means but not by the current of the first circuit means, and a signaling circuit closed over either a path including a front contact of said first relay and a back contact of said second relay or a path including a back contact of said first relay and a front contact of said second relay.

8. Railway track circuit apparatus comprising, a track section, a first circuit means including a source of alternating current and a first resistor for supplying across the rails at one end of the section a predetermined relatively high alternating voltage to provide a high shunting sensitivity for the track circuit because of breaking down of the rail film resistance by such voltage when the section is occupied, a second circuit means including a source of direct current and a second resistor for supplying across the rails at said one end of the section a direct voltage of a relatively high value which is effective to provide shunting sensitivity for the track circuit substantially equal to that provided by said predetermined alternating voltage, a power-off relay receiving power from said source of alternating current and operable when energized to close said first circuit means and when deenergized to close said second circuit means, a first and a second track relay, said first relay provided with connections including a back contact of said second relay for receiving energy from the rails at the other end of the section and said first relay responsive to said alternating voltage but not to said direct voltage, said second relay provided with connections for receiving energy from the rails at said other end of the section and said second relay responsive to said direct voltage but not to said alternating voltage, and a signaling circuit controlled over either a first path including a front contact of said first relay in series with a back contact of said second relay or a second path including a back contact of said first relay in series with a front contact of said second relay.

9. Railway track circuit apparatus comprising, a track section, a first circuit means including a source of alternating current and a first resistor for supplying across the rails at one end of the section a predetermined relatively high alternating voltage to provide a high shunting sensitivity for the track circuit because of breaking down of the rail film resistance by such voltage when the section is occupied, a second circuit means including a source of direct current and a second resistor for supplying across the rails at said one end of the section a direct voltage of a relatively high value which is effective to provide shunting sensitivity for the track circuit substantially equal to that provided by said predetermined alternating voltage, a power-off relay receiving power from said source of alternating current and operable when energized to close said first circuit means and when deenergized to close said second circuit means, a first and a second track relay, said first relay provided with connections including a back contact of said second relay and a third resistor for receiving energy from the rails at the other end of the section and said first relay responsive only to energy created by said alternating voltage, said second relay provided with connections including a fourth resistor and its own back contact in multiple with a fifth resistor for receiving energy from the rails at said other end of the section and said second relay responsive only to energy created by said direct voltage, and a signaling circuit controlled over either a first path including a front contact of said first relay or a second path including a front contact of said second relay.

HAROLD G. WITMER.